(12) United States Patent
Zheng

(10) Patent No.: US 11,695,623 B2
(45) Date of Patent: Jul. 4, 2023

(54) METHOD AND APPARATUS FOR BINDING NETWORK CARD IN MULTI-NETWORK CARD SERVER, AND ELECTRONIC DEVICE AND STORAGE MEDIUM

(71) Applicant: Beijing Kingsoft Cloud Technology Co., Ltd., Beijing (CN)

(72) Inventor: Feilong Zheng, Beijing (CN)

(73) Assignee: Beijing Kingsoft Cloud Technology Co., Ltd., Beijing (CN)

( * ) Notice: Subject to any disclaimer, the term of this patent is extended or adjusted under 35 U.S.C. 154(b) by 0 days.

(21) Appl. No.: 17/261,639

(22) PCT Filed: Sep. 24, 2020

(86) PCT No.: PCT/CN2020/117365
§ 371 (c)(1),
(2) Date: Jan. 20, 2021

(87) PCT Pub. No.: WO2021/120763
PCT Pub. Date: Jun. 24, 2021

(65) Prior Publication Data
US 2022/0337475 A1    Oct. 20, 2022

(30) Foreign Application Priority Data

Dec. 20, 2019 (CN) .......................... 201911328702.1

(51) Int. Cl.
*H04L 41/0803* (2022.01)
*H04L 61/4511* (2022.01)
(52) U.S. Cl.
CPC ...... *H04L 41/0803* (2013.01); *H04L 61/4511* (2022.05)
(58) Field of Classification Search
CPC ............. H04L 41/0803; H04L 61/4511; H04L 61/5061; H04L 65/40; H04L 67/141
See application file for complete search history.

(56) References Cited

U.S. PATENT DOCUMENTS 6,466,571 B1 * 10/2002 Dynarski .............. H04L 61/106
370/352
7,984,149 B1 * 7/2011 Grayson ............. H04L 65/1063
709/227

(Continued)

FOREIGN PATENT DOCUMENTS

CN           1878149 A    12/2006
CN         101552734 A    10/2009
(Continued)

OTHER PUBLICATIONS

International Search report for corresponding PCT application No. PCT/CN2020/117365 dated Dec. 16, 2020.

*Primary Examiner* — Jimmy H Tran
(74) *Attorney, Agent, or Firm* — McDonnell Boehnen Hulbert & Berghoff LLP

(57) ABSTRACT

The present application discloses a method and an apparatus for binding a network card in a multi-network card server, an electronic device and a computer readable storage medium. The method comprises: acquiring a target address of a target server, wherein a connection between the target server and the multi-network card server is to be established; querying an IP address library according to the target address to determine an operator to which the target address belongs, wherein the IP address library records a correspondence between IP addresses and operators; selecting a network card, according to the determined operator to which the target address belongs, corresponding to the determined operator from a plurality of network cards in the multi-network card server; and binding the selected network card to establish the connection between the multi-network card server and the target server. On the premise of avoiding the inter-operator connection, the present application realizes binding the corresponding network card to enable the auto- (Continued)

matic connection between the multi-network card server and the target server.

10 Claims, 4 Drawing Sheets

(56) References Cited

U.S. PATENT DOCUMENTS

| | | | | |
|---|---|---|---|---|
| 2002/0112076 A1* | 8/2002 | Rueda | ............... | H04L 12/1432 |
| | | | | 709/206 |
| 2003/0007482 A1* | 1/2003 | Khello | ............... | H04M 7/0075 |
| | | | | 370/328 |
| 2003/0108018 A1* | 6/2003 | Dujardin | ............ | H04L 67/1008 |
| | | | | 370/328 |
| 2003/0185233 A1* | 10/2003 | Ji | ............... | H04L 12/5692 |
| | | | | 370/466 |
| 2005/0020308 A1* | 1/2005 | Lai | ............... | H04W 12/08 |
| | | | | 455/558 |
| 2005/0198247 A1* | 9/2005 | Perry | ............... | H04L 9/40 |
| | | | | 709/223 |
| 2006/0075123 A1* | 4/2006 | Burr | ............... | H04L 61/35 |
| | | | | 709/228 |
| 2006/0129676 A1* | 6/2006 | Modi | ............... | H04L 61/00 |
| | | | | 709/227 |
| 2006/0165074 A1* | 7/2006 | Modi | ............... | H04L 69/16 |
| | | | | 370/389 |
| 2014/0129728 A1* | 5/2014 | Alex | ............... | H04L 61/4511 |
| | | | | 709/228 |
| 2015/0039762 A1* | 2/2015 | Xie | ............... | H04L 67/02 |
| | | | | 709/225 |
| 2016/0134629 A1* | 5/2016 | Rombouts | ........... | H04L 63/0876 |
| | | | | 713/168 |
| 2016/0182110 A1* | 6/2016 | Selvaraj | ............... | H04W 8/245 |
| | | | | 455/558 |
| 2016/0263228 A1* | 9/2016 | Kluge | ............... | C07K 14/503 |
| 2016/0285493 A1* | 9/2016 | Veneroso | ............. | H04L 67/306 |
| 2017/0289243 A1* | 10/2017 | Zhang | ............... | H04L 61/106 |
| 2019/0373084 A1* | 12/2019 | Reynolds | ........... | H04L 41/0853 |
| 2020/0162286 A1* | 5/2020 | Laas | ............... | H04L 12/4625 |
| 2020/0322782 A1* | 10/2020 | Gong | ............... | H04W 88/18 |
| 2021/0105845 A1* | 4/2021 | Zhu | ............... | H04L 47/193 |
| 2021/0400562 A1* | 12/2021 | Kang | ............... | H04W 48/02 |
| 2022/0159453 A1* | 5/2022 | Zhang | ............... | H04W 76/11 |
| 2022/0247624 A1* | 8/2022 | Johnson | ............... | G06Q 10/103 |
| 2022/0346168 A1* | 10/2022 | Zhu | ............... | H04L 61/5007 |

FOREIGN PATENT DOCUMENTS

| | | |
|---|---|---|
| CN | 104902463 A | 9/2015 |
| CN | 106130913 A | 11/2016 |
| CN | 107592209 A | 1/2018 |
| CN | 108848195 A | 11/2018 |
| CN | 110213084 A | 9/2019 |
| CN | 111107672 A | 5/2020 |
| EP | 3073773 B1 | 11/2019 |

\* cited by examiner

METHOD AND APPARATUS FOR BINDING NETWORK CARD IN MULTI-NETWORK CARD SERVER, AND ELECTRONIC DEVICE AND STORAGE MEDIUM

CROSS-REFERENCE TO RELATED APPLICATIONS

The present application is a U.S. National Phase Application under 35 U.S.C. § 371 of International Application No. PCT/CN2020/117365 filed Sep. 24, 2020, which claims priority to Chinese patent application No. 201911328702.1, filed with the China National Intellectual Property Administration on Dec. 20, 2019 and entitled "Method and apparatus for binding network card in multi-network card server, and electronic device and storage medium", the disclosures of which are incorporated herein by reference in their entirety.

TECHNICAL FIELD

The present application relates to the technical field of networks, in particular to a method and an apparatus for binding a network card in a multi-network card server.

BACKGROUND

The multi-network card (multi-line) server needs to connect to an opposite-end target server of a target address. The target address refers to an Internet Protocol (IP) address or domain name. For example, according to a client live broadcast request, a website access request, etc., when establishing a connection to the target server for pulling back to the source or responding to a corresponding request, the network connection between two servers is first established. Since the multi-network card server has multiple network cards corresponding to different operators, such as a network card corresponding to China Unicom, a network card corresponding to China Mobile, and a network card corresponding to China Telecom, it is necessary to select one network card to establish a connection with the opposite-end server of the target address.

Currently, binding the connection between a proxy server network card and the opposite-end server based on the target address has the following problems: the operator of the randomly allocated network card and the operator to which the target address belongs are not the same, which may cause inter-operator connection resulting in unsmooth connection; or, the manual configuration operations are complicated, the operator and the jump address are changed without informing the operation and maintenance to change the configuration correspondingly, which results in unsmooth connection.

SUMMARY

The present application aims to provide a method and an apparatus for binding a network card in a multi-network card server, an electronic device and a computer readable storage medium, so as to realize automatic connection between the multi-network card server and the target server on the premise of avoiding the inter-operator connection.

According to a first aspect of the present application, provided is a method for binding a network card in a multi-network card server, wherein the multi-network card server has a plurality of network cards corresponding to different operators, and the method comprises: a) acquiring a target address of a target server, wherein a connection between the target server and the multi-network card server is to be established; b) querying an IP address library according to the target address to determine an operator to which the target address belongs, wherein the IP address library records a correspondence between an IP address and the operator; c) selecting a network card, according to the determined operator to which the target address belongs, corresponding to the determined operator from a plurality of network cards in the multi-network card server; and d) binding the selected network card to establish the connection between the multi-network card server and the target server.

In an implementation, the target address is a domain name, and the step b) comprises: resolving the domain name to obtain an IP address corresponding to the domain name; and querying the IP address library according to the obtained IP address, to determine the operator to which the target address belongs.

In an implementation, the target address is an IP address, and the step b) comprises: querying the IP address library according to the IP address to determine the operator to which the target address belongs.

In an implementation, the method further comprises, after the step d), steps of: judging whether a jump of address occurs when the multi-network card server interacts with the target server; and when judging that the jump of address occurs, taking a received jump address as the target address to return to execute the steps b) to d).

According to a second aspect of the present application, provided is a method for binding a network card in a multi-network card server, wherein the multi-network card server has a plurality of network cards corresponding to different operators, and the method comprises: a) acquiring a target address of a target server, wherein a connection between the target server and the multi-network card server is to be established; b) querying an IP address library according to an IP address of the target address to determine the IP address of the network card in the multi-network card server corresponding to the IP address of the target address, wherein the IP address library records a correspondence between the IP address and the IP address of the network card in the multi-network card server; c) binding a network card indicated by the determined IP address of the network card to establish the connection between the target server and the multi-network card server.

In an implementation, the method further comprises, after the step c), steps of: judging whether a jump of address occurs when the multi-network card server interacts with the target server; and when judging that the jump of address occurs, taking a received jump address as the target address to return to execute the steps b) to c).

In an implementation, the method further comprises, before the step b), a step of establishing the IP address library, wherein the step of establishing the IP address library comprises: acquiring a correspondence between the IP address and the IP address of the network card in the multi-network card server according to the correspondence between the IP address and the operator, and the correspondence between the IP address of the network card in the multi-network card server and the operator; and recording the acquired correspondence between the IP address and the IP address of the network card in the multi-network card server into the IP address library.

According to a third aspect of the present application, provided is an apparatus for binding a network card in a multi-network card server, wherein the multi-network card server has a plurality of network cards corresponding to different operators, and the apparatus comprises: an acquiring module, configured for acquiring a target address of a target server, wherein a connection between the target server and the multi-network card server is to be established; a querying module, configured for querying an IP address library according to the target address to determine an operator to which the target address belongs, wherein the IP address library records a correspondence between an IP address and the operator; a selecting module, configured for selecting a network card, according to the operator to which the target address belongs determined by the querying module, corresponding to the determined operator from a plurality of network cards in the multi-network card server; and a binding module, configured for binding the selected network card to establish the connection between the multi-network card server and the target server.

According to a forth aspect of the present application, provided is an apparatus for binding a network card in a multi-network card server, wherein the multi-network card server has a plurality of network cards corresponding to different operators, and the apparatus comprises: an acquiring module, configured for acquiring a target address of a target server, wherein a connection between the target server and the multi-network card server is to be established; a querying module, configured for querying an IP address library according to an IP address of the target address to determine the IP address of the network card in the multi-network card server corresponding to the IP address of the target address, wherein the IP address library records a correspondence between the IP address and the IP address of the network card in the multi-network card server; a binding module, configured for binding a network card indicated by the determined IP address of the network card to establish the connection between the target server and the multi-network card server.

According to a fifth aspect of the present application, provided is an electronic device, the electronic device comprises: the apparatus for binding the network card in the multi-network card server according to the third aspect or the forth aspect of the present application; or, a processor and a memory, the memory being configured for storing executable instructions configured to control the processor to perform the method for binding the network card in the multi-network card server according to the first aspect or the second aspect of the present application.

According to a sixth aspect of the present application, provided is a computer-readable storage medium, having stored thereon computer programs that, upon executed by a processor, cause implementation of the method for binding the network card in the multi-network card server according to the first aspect of the present application.

According to the embodiments of present application, the IP address library is queried before the connection is established, the operator corresponding to the target IP address is determined, and then the network card corresponding to the operator in a multi-network card server is selected and bound according to the determined operator, so that the connection between the multi-network card server and the target server is automatically established, which avoids the inter-operator connection issue aroused by random allocation of the network cards, as well as the complicated manual allocation, and thus improves the network connection efficiency.

Other features of the present application and advantages thereof will become apparent from the following detailed description of exemplary embodiments thereof, which proceeds with reference to the accompanying drawings.

BRIEF DESCRIPTION OF THE DRAWINGS

The accompanying drawings, which are incorporated in and constitute a part of this description, illustrate embodiments of the present application and, together with the description, serve to explain the principles of the present application.

DETAILED DESCRIPTION

Figure 1:
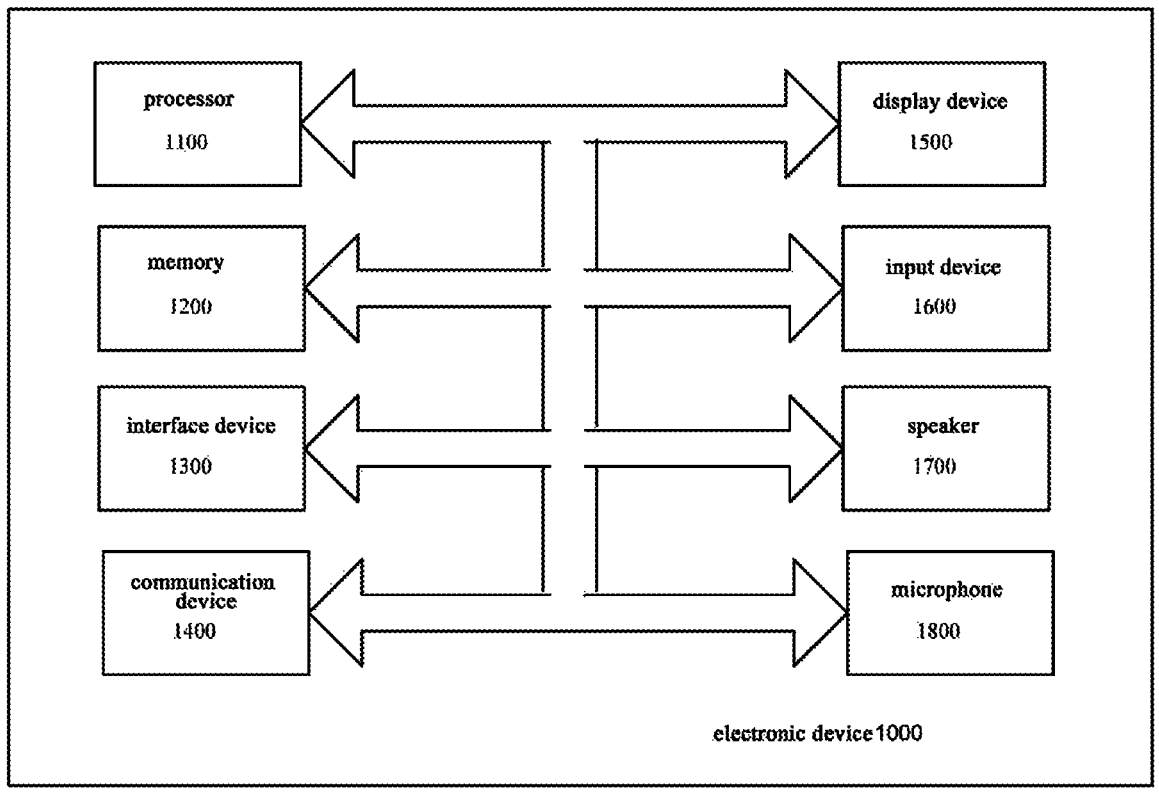
FIG. 1 is a structural block diagram illustrating a hardware configuration of an electronic device that may be used to implement an embodiment of the present application.

Various exemplary embodiments of the present application will now be described in detail with reference to the accompanying drawings. It should be noted that: the relative arrangement of the components and steps, numerical expressions and numerical values set forth in these embodiments do not limit the scope of the present application unless specifically stated otherwise.

The following description of at least one exemplary embodiment is merely illustrative in nature and is in no way intended to limit the present application, its application, or uses.

Techniques, methods and devices known to those of ordinary skill in the art may not be discussed in detail but are intended to be part of the specification where appropriate.

In all examples shown and discussed herein, any particular value should be construed as exemplary only and not as limiting. Thus, other examples of the exemplary embodiments may have different values.

It should be noted that: similar reference numbers and letters refer to similar items in the following figures, and thus, once a certain item is defined in one figure, it need not be discussed further in subsequent figures.

In the related art, there are generally two methods for binding the connection between the network card in the proxy server and the opposite-end server according to the target address:

1. The operating system of the multi-network card server selects the network card of the server in a random allocation way and establishes connection with the opposite-end target server of the target address. However, in this way of randomly allocating to bind the network card, the issue may be that the operator of the allocated network card and the operator to which the target address belongs are not the same, which may cause inter-operator connection resulting in unsmooth connection.

2. The network card is allocated to establish connection according to manual configuration, namely a configurator manually judges which operator of the target address (IP address or domain name) is, correspondingly configures the connection between the network card corresponding to the multi-network card server and the opposite-end target server of the target address. This manual configuration has the following disadvantages:

a. a great number of manual operations are required, for example, searching through Baidu to determine which operator address the target address belongs to;

b. if the target address is a domain name, the configuration is not updated by the operation and maintenance according to the change of the operator resolved from the domain name, leading to the inter-operator connection and unsmooth connection;

c. if the content returned by the opposite-end target server of the target address is a jump address "http 3" (3 is a jump status code, such as 301, 302, 301, etc., and the 3** code starting with 3 is a redirection status code, which indicates that the client is required to take further operation to complete the request); or jump address in other forms, then a network card corresponding to the returning jump address is required to be correspondingly generated during manual configuration;

d. if the returning jump address changes without informing the operation and maintenance to change the configuration, the inter-operator connection and unsmooth connection is established.

Aiming at the problems in the related technology, according to the embodiments of present application, an IP address library is queried before the connection is established, the operator corresponding to the target IP address is determined, and then the network card corresponding to the operator in a multi-network card server is selected and bound according to the determined operator, so that the automatic connection between the multi-network card server and the target server is established, which avoids the inter-operator connection issue aroused by random allocation of the selected network cards, as well as the complicated manual allocation, and thus improves the network connection efficiency.

FIG. 1 is a block diagram illustrating a hardware configuration of an electronic device 1000 that may be used to implement an embodiment of the present application.

The electronic device 1000 may be a portable computer, a desktop computer, a mobile phone, a tablet computer, a server device, etc.

The server device can be an integral server or a distributed server across multiple computers or computer data centers. The server can be of various types, such as, but not limited to, a node device of a content distribution network, a storage server of a distributed storage system, a cloud database server, a cloud computing server, a cloud management server, a web server, a news server, a mail server, a message server, an advertising server, a file server, an application server, an interactive server, a storage server, a database server or a proxy server, etc. In some embodiments, each server may comprise hardware, software, or an embedded logic component or a combination of two or more such components for performing suitable functions supported or implemented by the server. For example, the server may be a blade server, a cloud server, etc., or may be a server group composed of multiple servers, and may comprise one or more of the foregoing types of servers, and so on.

As shown in FIG. 1, the electronic device 1000 may comprise a processor 1100, a memory 1200, an interface device 1300, a communication device 1400, or may also comprise a display device 1500, an input device 1600, a speaker 1700, a microphone 1800, and so on. The processor 1100 may be a central processing unit (CPU), a microprocessor (MCU), etc., for executing computer programs. The computer program may be written with an instruction set of architectures such as x86, Arm, RISC, MIPS, SSE, etc. The memory 1200 comprises, for example, a ROM (Read Only Memory), a RAM (Random Access Memory), a nonvolatile memory such as a hard disk, and the like. The interface device 1300 comprises, for example, a USB interface, a headphone interface, and the like. The communication device 1400 is capable of wired communication using, for example, an optical fiber or cable, or wireless communication, and specifically may comprise WiFi communication, Bluetooth communication, 2G/3G/4G/5G communication, and the like. The display device 1500 is, for example, a liquid crystal display, a touch display, or the like. The input device 1600 may comprise, for example, a touch screen, a keyboard, a somatosensory input, etc. The user can input/output voice information through the speaker 1700 and the microphone 1800.

The electronic device shown in FIG. 1 is only illustrative and in no way intended to limit the present application, its application or use. In an implementation of the present application, the memory 1200 of the electronic device 1000 is configured for storing instructions configured to control the processor 1100 to operate to perform any of the method for binding a network card in the multiple network card servers according to the present application. It should be understood by those skilled in the art that although multiple devices are shown for the electronic device 1000 in FIG. 1, the present application may only involve some of the devices. For example, the electronic device 1000 may only involve the processor 1100 and the storage device 1200. Instructions may be designed by those skilled in the art according to the scheme disclosed in the present application. It is well known in the art that how the instructions control the processor to operate, which will not be described in detail here.

Figure 2:
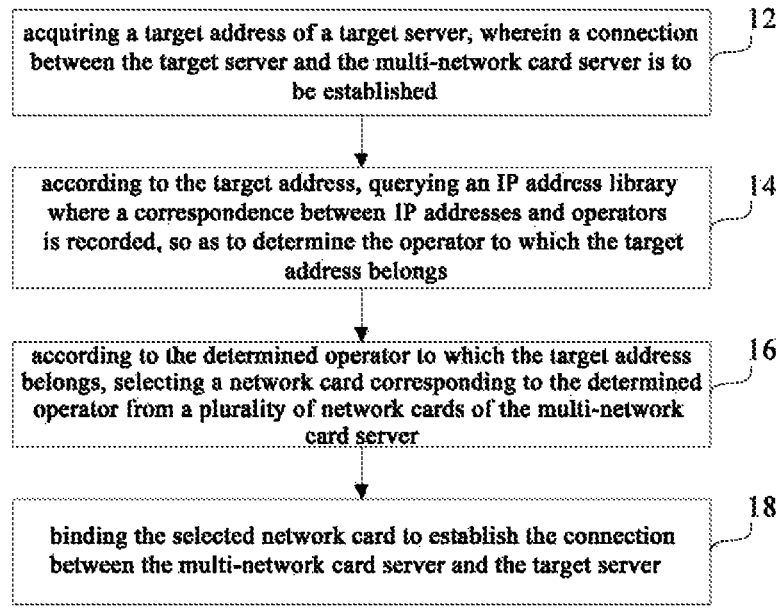
FIG. 2 is a flowchart of steps of a method for binding a network card in a multi-network card server according to a first embodiment of the present application.

In an implementation of the present application, provided is a method for binding a network card in a multi-network card server, wherein the multi-network card server has a plurality of network cards corresponding to different operators, as shown in FIG. 2 which is a flowchart of steps of a method for binding a network card in a multi-network card server according to a first embodiment of the present application. The method for binding a network card according to the present embodiment may be implemented by an electronic device, and the electronic device may be, for example, the electronic device 1000 shown in FIG. 1.

As shown in FIG. 2, the method for binding the network card in the multi-network card server according to the embodiment of the present application comprises the following steps:

at step 12, acquiring a target address of a target server, wherein a connection between the target server and the multi-network card server is to be established;

at step 14, querying an IP address library according to the target address to determine an operator to which the target address belongs, wherein the IP address library records a correspondence between IP addresses and operators;

at step 16, selecting a network card, according to the determined operator to which the target address belongs, corresponding to the determined operator from a plurality of network cards in the multi-network card server;

at step 18, binding the selected network card to establish the connection between the multi-network card server and the target server.

It should be noted that the aforementioned target address may be a domain name or an IP address, but is not limited to this.

In an implementation, the target address is a domain name, and in which case the step 14 comprises: resolving the domain name to obtain an IP address corresponding to the domain name; and querying the IP address library according to the obtained IP address to determine the operator to which the target address belongs.

In an implementation, the target address is an IP address, and in which case the step 14 comprises: querying the IP address library according to the IP address to determine the operator to which the target address belongs.

After the above step 18 of binding the selected network card to establish the connection between the multi-network card server and the target server, the method for binding a network card in a multi-network card server according to the embodiment of the present application further comprises: judging whether a jump of address occurs when the multi-network card server interacts with the target server; and when judging that the jump of address occurs, taking a received jump address as the target address to return to execute the steps 14 to 18.

It should be noted that the above mentioned jump of address may refer to the following explanation, which will not be repeated here.

Figure 3:
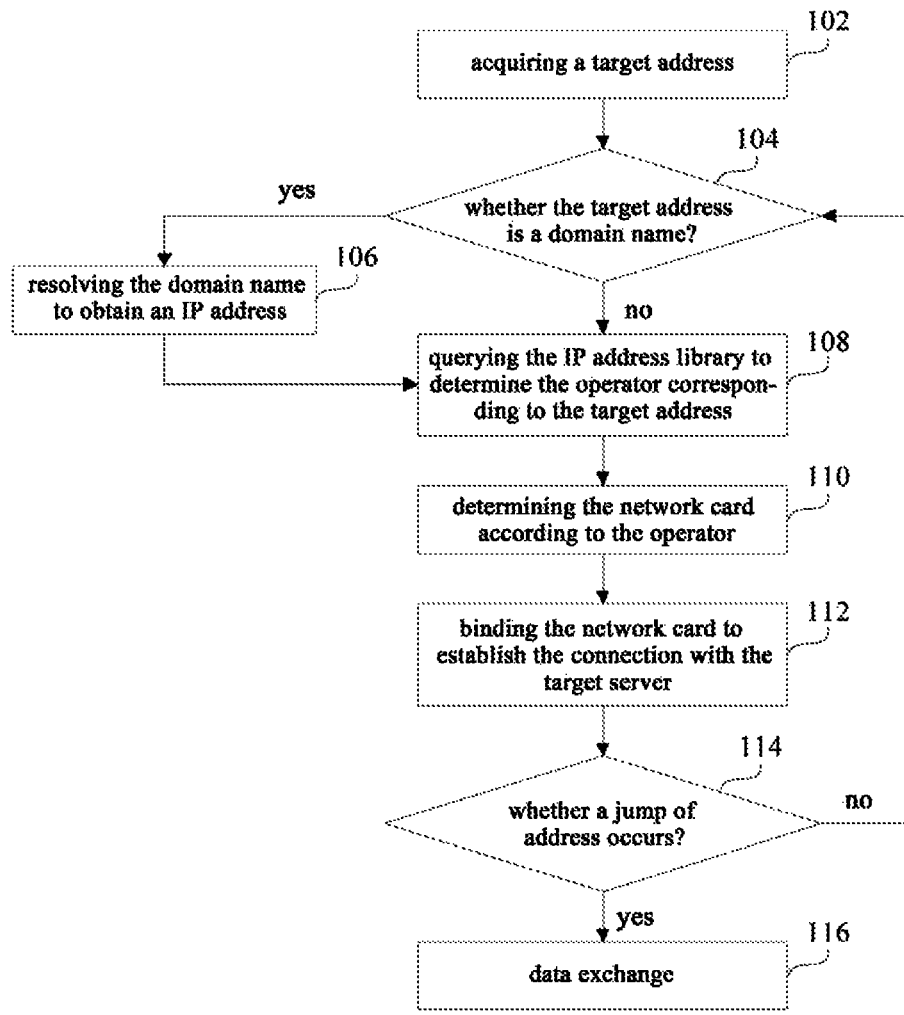
FIG. 3 is a flowchart of an example of the method for binding the network card in the multi-network card server according to the first embodiment of the present application.

The method for binding a network card according to the first embodiment of the present application will be described in detail with reference to FIG. 3. FIG. 3 is a flowchart of an example of a method for binding a network card in a multi-network card server according to the first embodiment of the present application, the method for binding a network card according to the embodiment of the present application is executed on the multi-network card server, which has at least two network cards corresponding to different operators, for example, corresponding to at least two network cards of China Mobile, China Unicom, China Telecom, and Radio and Television. The purpose is to bind, according to the received request, a local network card to establish a connection with the opposite-end target server, so that a request may be sent to the target server to perform corresponding data acquisition or exchange through the established network.

As shown in FIG. 3, when a connection needs to be initiated, at step 102, firstly a target address of a target server is acquired, wherein a connection between the target server and the multi-network card server is to be established. The target address may be directly an IP address or a domain name. The target address can be obtained by resolving from an Uniform Resource Locator (URL) address requested to be accessed from the client server or other proxy server or other node server received by the multi-network card server.

After acquiring the target address, at step 104, it is possible to further judge whether the received target address is a domain name. If the target address is a domain name, step 106 is executed, resolving the domain name to obtain an IP address corresponding to the domain name. If it is judged that the target address is not a domain name, it indicates that the acquired target address is an IP address.

After obtaining the IP address of the target address by resolving the domain name, or directly acquiring the target address in the form of an IP address, at step 108, querying an IP address library according to the IP address of the target address to determine an operator to which the target address belongs, such as the target IP address of the access-requested opposite-end target server is China Mobile, China Unicom or China Telecom. The IP address library is a database, in which the correspondence between the IP addresses and the operators is recorded in advance, for example, there records that to which operator does each of more than 100 IP addresses around the world belongs. In addition, when there is a change in the correspondence between the IP addresses and the operators, the IP address library can also be updated in real time to ensure that the correspondence between the IP addresses in the IP address library and the operators is accurate in real time.

The IP address library may be provided locally, that is, in a multi-network card server. In other embodiments, the IP address library may also be provided in a third-party device, and the operator to which the target address belongs is determined by accessing the third-party device to query the IP address library.

Then, at step 110, according to the determined operator to which the target address belongs, a network card corresponding to the operator is selected from a plurality of network cards in the multi-network card server. For example, after searching the IP address library, it is determined that the IP address of the target address belongs to China Mobile operator, that is, the target address is an address from China Mobile, then the network card corresponding to China Mobile is required to be selected from a plurality of network cards in the multi-network card server to establish a connection with the opposite-end target server. Each of the network cards in the multi-network card server has a corresponding IP address. From the IP address of the network card, it can be distinguished which operator's network the network card uses for communication. Therefore, when it is determined that the target address is an address from China Mobile, the network card that has an IP address of China Mobile is selected in the multi-network card server.

In an implementation, at step 112, the selected network card is bound to establish the connection between the multi-network card server and the target server. After the connection is established, when the multi-network card server sends a request to access the target address to the opposite-end target server, there may occur a jump of the requested target address. For example, the content returned by the opposite-end target server of the target address is a jump address "http 3" (3 is a jump status code, such as 301, 302, 301, etc.,); or jump address in other forms, then at step 114, it is required to judge whether a jump of address occurs in the sending of the request when the multi-network card server interacts with the target server after the connection between the multi-network card server and the target server is established.

When judging that no jump of address occurs, the requested data exchange is performed between the multi-network card server and the target server. When judging that the jump of address occurs, taking jump address received by the multi-network-card server as the target address to return back to step 104, and the steps 104 to 114 are repeated, thus determining the operator to which the jump address belongs according to the IP address of the jump address and selecting the network card corresponding to the operator to which the jump address belongs from the multi-network card server, thereby establishing a connection between the multi-network card server and the server of the jump address again.

At step 116, according to the request, a data exchange is performed between the multi-network card server and the server of the jump address, wherein the connection therebetween is successfully established.

In the method for binding the network card in the multi-network card server according to the embodiment of the present application, an IP address library can be queried before the connection is established, the operator corresponding to the target IP address is determined (if the target address is a domain name, the domain name is firstly resolved to acquire the target IP address), and then the network card corresponding to the operator in a multi-network card server is selected and bound according to the determined operator, so that the connection between the multi-network card server and the target server is established.

In the embodiment of the present application, by recording the correspondence between IP addresses and operators in the IP address library, an operator can be automatically identified for the target address or the address with a status code of 3** (jump address), and the corresponding network card can be automatically bound without manual operations required, which avoids the inter-operator connection issue aroused by random allocation of the network cards, as well as the complicated manual allocation, and thus improves the network connection efficiency.

In addition, when the operator changes without informing the operation and maintenance to change the configuration, there will be no inter-operator connection and thus no unsmooth connection established.

When a jump of address occurs, the operator to which the jump address belongs is automatically identified, and the corresponding network card is bound to establish a connection. Therefore, there is no need to wait for the re-generation of the network card corresponding to the jump address during configuration to continue to establish the connection, which will cause the connection to be delayed.

Similarly, there will be no inter-operator connection and thus no unsmooth connection established when the operator changes without informing the operation and maintenance to change the configuration.

Figure 4:
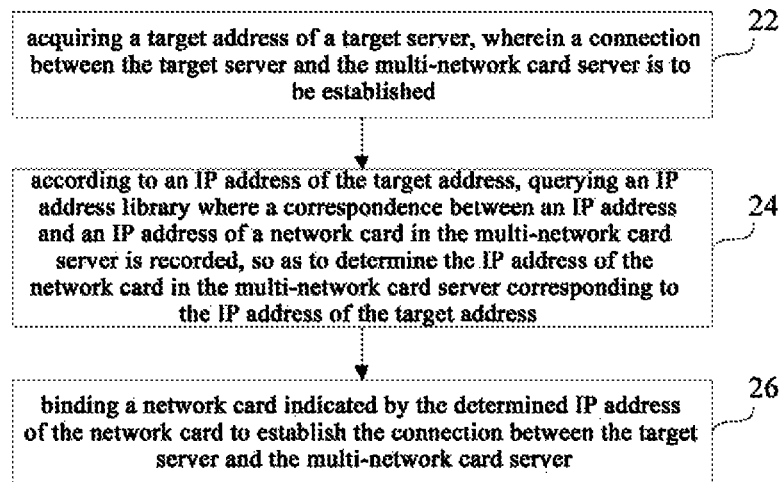
FIG. 4 is a flowchart of steps of a method for binding a network card in a multi-network card server according to a second embodiment of the present application.

Next referring to FIG. 4 which is a flowchart of steps of a method for binding a network card in a multi-network card server according to a second embodiment of the present application. The embodiment in FIG. 4 has a different address library from the embodiment in FIG. 2.

As shown above, in the embodiment in FIG. 2, the correspondence between the IP address and the operator is recorded in the IP address library. In the embodiment in FIG. 4, the correspondence between the IP address and the IP address of the network card in the multi-network card server is recorded in the IP address library.

Similarly, the method for binding a network card according to the present embodiment may be implemented by an electronic device, and the electronic device may be, for example, the electronic device 1000 shown in FIG. 1.

As shown in FIG. 4, the method for binding the network card in the multi-network card server according to the embodiment of the present application comprises:

at step 22, acquiring a target address of a target server, wherein a connection between the target server and the multi-network card server is to be established;

at step 24, querying an IP address library according to an IP address of the target address to determine the IP address of the network card in the multi-network card server corresponding to the IP address of the target address, wherein the IP address library records a correspondence between IP addresses and IP addresses of the network cards in the multi-network card server;

at step 26, binding a network card indicated by the determined IP address of the network card to establish the connection between the target server and the multi-network card server.

After the above step 26 of binding a network card indicated by the determined IP address of the network card to establish the connection between the target server and the multi-network card server, the method for binding the network card in a multi-network card server according to the embodiment of the present application further comprises: judging whether a jump of address occurs when the multi-network card server interacts with the target server; and when judging that the jump of address occurs, taking a received jump address as the target address to return to execute the steps 24 to 26.

Hereinafter, a method for binding a network card in a multi-network card server according to a second embodiment of the present application will be described in detail with reference to FIG. 5, which is a flowchart of an example of the method for binding the network card in the multi-network card server according to the second embodiment of the present application.

Figure 5:
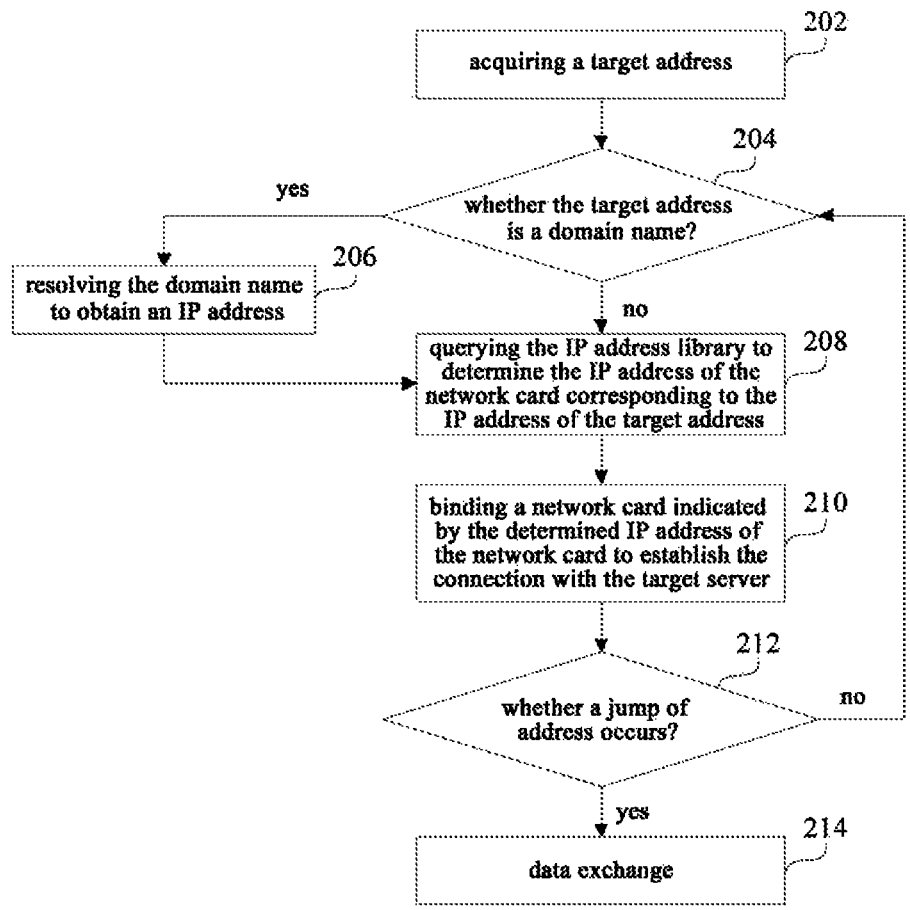
FIG. 5 is a flowchart of an example of the method for binding the network card in the multi-network card server according to the second embodiment of the present application.

As shown in FIG. 5, when a connection needs to be initiated, at step 202, a target address of a target server is first acquired, wherein a connection between the target server and the multi-network card server is to be established. The target address may be directly an IP address or a domain name.

At step 204, it is possible to further judge whether the received target address is a domain name. If the target address is a domain name, step 206 is executed, resolving the domain name to obtain an IP address corresponding to the domain name. If it is judged that the target address is not a domain name, it indicates that the acquired target address is an IP address.

Then at step 208, an IP address library is queried according to the IP address of the target address to determine the IP address of the network card in the multi-network card server corresponding to the IP address of the target address, such as the target IP address of the access-requested opposite-end target server is China Mobile, China Unicom or China Telecom. In the present embodiment, the correspondence between IP addresses and IP addresses of each network card in the multi-network card server is recorded in the IP address library in advance.

In an implementation, the method for binding the network card according to the present embodiment may comprise a step of establishing the IP address library before step 208. Specifically, the step comprises: acquiring a correspondence between the IP address and the IP address of the network card in the multi-network card server according to the correspondence between the IP address and the operator, and a correspondence between the IP address of the network card in the multi-network card server and the operator.

Then, the correspondence between the IP address and the IP address of the network card in the multi-network card server is recorded into the IP address library.

In the present embodiment, the IP address directly corresponds to the IP address of the network card. When a request for the target address is received, the IP address library is queried according to the acquired IP address of the target address, and the network card that can be connected with the target address server may be directly determined from the multi-network card server.

Similarly, when there is a change in the correspondence between the IP address and the operator, which causes the correspondence between the IP address and the corresponding IP address of the network card to change, the IP address library can also be updated in real time to ensure the correspondence between the IP address in the IP address library and the IP address of the network card is accurate in real time.

In the present embodiment, the IP address library may be provided locally or be provided in a third-party device.

According to the determined IP address of the network card in the multi-network card server, the corresponding network card in the multi-network card server can be determined. Each of the network cards has a fixed IP address, thus the network card can be correspondingly determined by determining the IP address thereof.

Then at step 210, a network card indicated by the determined IP address of the network card is bound to automatically establish the connection between the target server and the multi-network card server. After the connection is established, when the multi-network card server sends a request to access the target address to the opposite-end target server for interaction, there may occur a jump of the requested target address. Thus it is required to judge whether a jump of address occurs in the sending of the request after the connection is established at step 212.

When no jump of address occurs, the requested data exchange is performed between the multi-network card server and the target server. When judging that the jump of address occurs, the jump address received by the multi-network card server is returned to step 204 as the target address, and steps 204 to 212 are repeated to determine the IP address of the corresponding network card in the multi-network card server according to the IP address of the jump address so as to determine the corresponding network card, and then the connection between the multi-network card server and the jump address server is established again.

At step 214, according to the request, a data exchange is performed between the multi-network card server and the server of the jump address, wherein the connection therebetween is successfully established.

In the method for binding the network card in the multi-network card server according to the embodiment of the present application, an IP address library can be queried before the connection is established, to determine the IP address of the network card in the multi-network card server corresponding to the target IP address (if the target address is a domain name, the domain name is firstly resolved to acquire the target IP address), and then the corresponding network card is selected and bound according to the IP address of the network card, so that the connection between the multi-network card server and the target server is established.

In the embodiment of the present application, by recording the correspondence between IP addresses and IP addresses of the network card in the multi-network card server in the IP address library, the operator can be automatically identified for the target address or the address with a status code of 3** (jump address), and the corresponding network card can be automatically bound without manual operations required, which avoids the inter-operator connection issue aroused by random allocation of the network cards, as well as the complicated manual allocation, and thus improves the network connection efficiency.

In addition, when configuration changes, there will be no inter-operator connection and thus no unsmooth connection established. When a jump of address occurs, there is no need to wait for the re-generation of the network card corresponding to the jump address during configuration to continue to establish the connection, which will cause the connection to be delayed.

Figure 6:
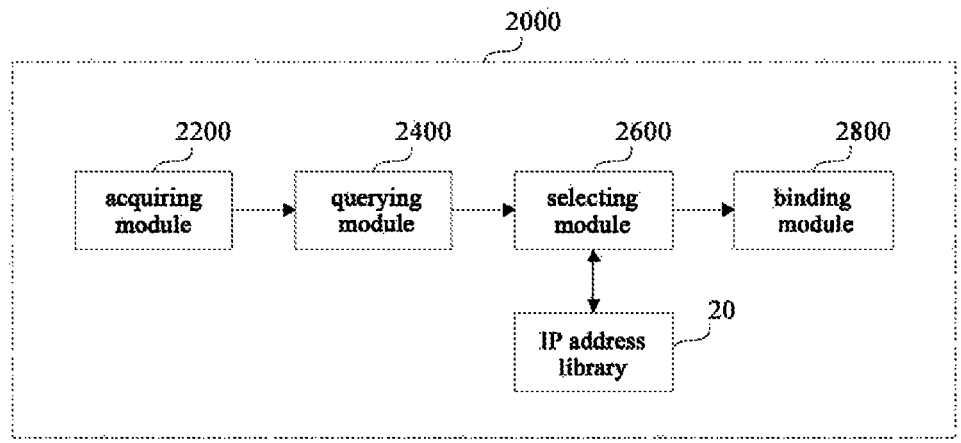
FIG. 6 is a structural block diagram illustrating an apparatus for binding a network card in a multi-network card server according to the first embodiment of the present application.

In another embodiment of the present application, provided is an apparatus 2000 for binding a network card in a multi-network card server, wherein the multi-network card server has a plurality of network cards corresponding to different operators. FIG. 6 is a structural block diagram illustrating an apparatus for binding a network card in a multi-network card server according to the first embodiment of the present application.

As shown in FIG. 6, the apparatus 2000 for binding a network card in a multi-network card server comprises an acquiring module 2200, a querying module 2400, a selecting module 2600, and a binding module 2800.

The acquiring module 2200 is configured for acquiring a target address of a target server, wherein a connection between the target server and the multi-network card server is to be established. The querying module 2400 is configured for querying an IP address library 20 according to the target address to determine the operator to which the target address belongs, wherein the IP address library 20 records a correspondence between an IP address and the operator. The selecting module 2600 is configured for selecting a network card, according to the operator to which the target address belongs determined by the querying module 2400, corresponding to the determined operator from a plurality of network cards in the multi-network card server, and the binding module 2800 is configured for binding the selected network card to establish the connection between the multi-network card server and the target server.

When the target address is a domain name, the querying module 2400 resolves the domain name to obtain the IP address corresponding to the domain name, and queries the IP address library 20 according to the obtained IP address so as to determine the operator to which the target address belongs.

When the target address is an IP address, the querying module 2400 queries the IP address library 20 according to the IP address so as to determine the operator to which the target address belongs.

In an implementation, an apparatus 2000 for binding a network card further comprises a jump address returning module (not shown). The jump address returning module is configured for judging whether a jump of address occurs when the multi-network card server interacts with the target server; and when judging that the jump of address occurs, taking a received jump address as the target address to return to the querying module 2400, so as to repeat the query of the operator to which the jump address belongs, and selecting the network card corresponding to the operator to which the jump address belongs by means of the selecting module 2600, thus establishing a connection between the multi-network card server and the target server to realize data exchange.

Figure 7:
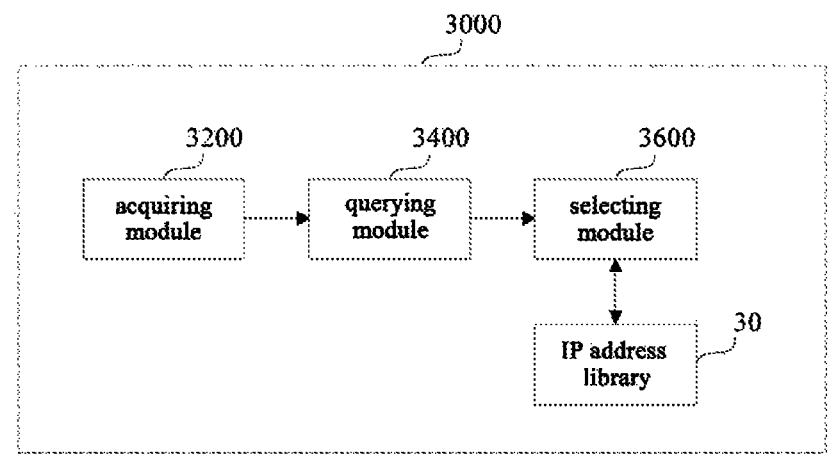
FIG. 7 is a structural block diagram illustrating an apparatus for binding a network card in a multi-network card server according to the second embodiment of the present application.

In another embodiment of the present application, further provided is an apparatus 3000 for binding a network card in a multi-network card server, wherein the multi-network card server has a plurality of network cards corresponding to different operators. FIG. 7 is a structural block diagram illustrating an apparatus for binding a network card in a multi-network card server according to the second embodiment of the present application.

The apparatus for binding the network card of the embodiment in FIG. 7 has a different IP address library from that of the embodiment in FIG. 6. In the embodiment of FIG. 6, the correspondence between IP addresses and operators is recorded in the IP address library 20. In the embodiment of FIG. 7, the correspondence between IP addresses and IP addresses of the network card in the multi-network card server is recorded in the IP address library 30.

As shown in FIG. 7, the apparatus 3000 for binding the network card comprises an acquiring module 3200, a querying module 3400, and a binding module 3600. The acquiring module 3200 is configured for acquiring a target address of a target server, wherein a connection between the target server and the multi-network card server is to be established. The querying module 3400 is configured for querying an IP address library 30, according to an IP address of the target address to determine the IP address of the network card in the multi-network card server corresponding to the IP address of the target address, wherein the IP address library 20 records a correspondence between IP addresses and IP addresses of the network card in the multi-network card server. The binding module 3600 is configured for binding a network card indicated by the determined IP address of the network card to establish the connection between the target server and the multi-network card server.

Similarly, in an implementation, the apparatus 3000 for binding a network card also comprises a jump address returning module (not shown). The jump address returning module is configured for judging whether a jump of address occurs when the multi-network card server interacts with the target server; and when judging that the jump of address occurs, taking a received jump address as the target address to return to the querying module 3400 and the binding module 3600, so as to select a network card corresponding to the operator to which the jump address belongs, thus establish a connection between the multi-network card server and the target server to realize data exchange.

In an implementation, the apparatus 3000 for binding a network card may further comprise an establishing module (not shown) configured for establishing an IP address library 30. The establishing module is configured for acquiring a correspondence between the IP address and the IP address of the network card in the multi-network card server according to the correspondence between the IP address and the operator, and a correspondence between the IP address of the network card in the multi-network card server and the operator; and recording the correspondence between the IP address and the IP address of the network card in the multi-network card server into the IP address library 30.

In another embodiment of the present application, further provided is an electronic device. The electronic device 4000 may be the electronic device 1000 shown in FIG. 1, and FIG. 8 is a structural block diagram illustrating an electronic device according to an embodiment of the present application.

On the one hand, the electronic device 4000 may comprise the aforementioned apparatus 2000 for binding the network card in the multi-network card server, configured for implementing the method for binding the network card in the multi-network card server according to the first embodiment of the present application. Alternatively, the electronic device 4000 may comprise the aforementioned apparatus 3000 for binding the network card in the multi-network card server, configured for implementing the method for binding the network card in the multi-network card server according to the second embodiment of the present application.

Figure 8:
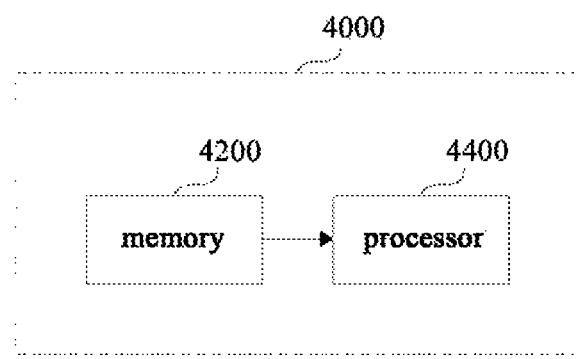
FIG. 8 is a structural block diagram illustrating an electronic device according to an embodiment of the present application.

On the other hand, as shown in FIG. 8, the electronic device 4000 may comprise a memory 4200 and a processor 4400. The memory 4200 is configured for storing executable instructions configured to control the processor 4400 to perform the aforementioned method for binding the network card in the multi-network card server.

In the present embodiment, the electronic device 4000 may be any electronic product with a memory 4200 and a processor 4400, such as a mobile phone, a tablet computer, a palmtop computer, a desktop computer, a notebook computer, a workstation, a game console, and a server.

Finally, according to another embodiment of the present application, further provided is a computer-readable storage medium, having stored thereon computer programs that, upon executed by a processor, cause implementation of the method for binding the network card in the multi-network card server according to any embodiment of the present application.

The present application may relate to a system, method, and/or computer program product. The computer program product may comprise a computer-readable storage medium loaded with computer-readable program instructions configured to enable a processor to implement various aspects of the present application.

The computer-readable storage medium may be a tangible device that can hold and store instructions used by the instruction execution device. The computer-readable storage medium may be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage medium comprise: a portable computer disk, a hard disk, a random access memory (RAM), a read only memory (ROM), an erasable programmable read only memory (EPROM or a flash memory), a static random access memory (SRAM), a portable compact disk read-only memory (CD-ROM), a digital versatile disk (DVD), a memory stick, a floppy disk, a mechanical encoding device, such as a punch card with instructions stored thereon or protruding structure in the groove, and any suitable combination of the above. The computer-readable storage medium used here is not interpreted as a transient signal itself, such as radio waves or other freely propagating electromagnetic waves, electromagnetic waves propagating through waveguides or other transmission media (for example, light pulses through fiber optic cables), or electrical signals through wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may comprise copper transmission cables, optical fiber transmission, wireless transmission, routers, firewalls, switches, gateway computers, and/or edge servers. The network adapter card or network interface in each computing/processing device receives computer-readable program instructions from the network, and forwards the computer-readable program instructions for storage in the computer-readable storage medium in each computing/processing device.

The computer program instruction configured for performing the operations of the present application can be an assembly instructions, an instruction set architecture (ISA) instruction, a machine instruction, a machine-related instruction, a microcode, a firmware instruction, state setting data, or source code or object code written in any combination of one or more programming languages, the programming languages comprise an object-oriented programming languages-such as Smalltalk, C++, etc., and conventional procedural programming languages-such as "C" language or similar programming languages. Computer readable program instructions can be executed entirely on the user's computer, partly on the user's computer, as an independent software package, partly on the user's computer and partly on a remote computer, or entirely on the remote computer or server. In the case of the remote computer, the remote computer can be connected to the user's computer through any kind of network, comprising a local area network (LAN) or a wide area network (WAN), or it can be connected to an external computer (for example, using an Internet service provider to access the Internet connection). In some embodiments, an electronic circuit, such as a programmable logic circuit, a field programmable gate array (FPGA), or a programmable logic array (PLA), can be customized by utilizing the state information of computer-readable program instructions, which can implement various aspects of the present application.

Herein, various aspects of the present application are described with reference to the flowcharts and/or block diagrams of the method, apparatus (system) and computer program product according to the embodiments of the present application. It should be understood that each block of the flowchart and/or block diagram and the combination of each block in the flowchart and/or block diagram can be implemented by computer readable program instructions.

These computer-readable program instructions can be provided to the processors of general-purpose computers, special-purpose computers, or other programmable data processing apparatuses, thereby producing a machine that makes these instructions when executed by the processors of the computer or other programmable data processing apparatuses, an apparatus that implements the functions/actions specified in one or more blocks in the flowchart and/or block diagram is produced. It is also possible to store these computer-readable program instructions in a computer-readable storage medium. These instructions enable computers, programmable data processing apparatuses, and/or other devices work in a specific manner. Thus, the computer-readable medium having instructions storing thereon includes an article of manufacture, which includes instructions for implementing various aspects of the functions/actions specified in one or more blocks in the flowchart and/or block diagram.

It is also possible to load computer-readable program instructions onto a computer, other programmable data processing apparatus, or other device, so that a series of operation steps are executed on the computer, other programmable data processing apparatus or other device, leading to a process of computer implement, so as to enable the instructions executed on the computer, other programmable data processing apparatus, or other device to achieve the function/action specified in one or more boxes in the flowchart and/or block diagram.

The flowcharts and block diagrams in the attached drawings show the possible architectures, functions and operations of the systems, methods and computer program products according to various embodiments of the present application. In this regard, each block in the flowchart or block diagrams may represent a part of a module, a program segment or an instruction that contains one or more executable instructions configured for implementing a specified logical function. In some alternative implementations, the functions recorded in the block may also occur in a different order than those recorded in the drawings. For example, two consecutive blocks can actually be executed essentially in parallel, and sometimes in reverse order, depending on the function involved. It should also be noted that each block in the block diagrams and/or flowchart, and the combination of blocks in the block diagrams and/or flowchart, can be implemented by a dedicated hardware based system that performs the specified function or action, or a combination of dedicated hardware and computer instructions. It is well known to those skilled in the art that implementation by hardware, by software, and by combination of software and hardware are equivalent.

Various embodiments of the present application have been described above, and the above description is exemplary, not exhaustive, and is not limited to the disclosed embodiments. Without departing from the scope and spirit of the described embodiments, many modifications and variations are obvious to those of ordinary skill in the art. The choice of terms used herein is intended to best explain the principles, practical applications or technical improvements to the market of each embodiment, or to enable other ordinary technical persons in the art to understand the various embodiments disclosed herein. The scope of the present application is defined by the appended claims.

INDUSTRIAL APPLICABILITY

In related technologies, binding the connection between the proxy server network card and the opposite-end server based on the target address has the following problems: the operator of the allocated network card and the operator to which the target address belongs are not the same, which may cause inter-operator connection resulting in unsmooth connection; or, the manual configuration operations are complicated, the operator and the jump address are changed without informing the operation and maintenance to change the configuration correspondingly, which results in unsmooth connection.

In view of the problems in related technologies, in the embodiment of the present application, an IP address library is queried before the connection is established, an operator corresponding to a target IP address is determined, and then according to the determined operator, a network card in a multi-network card server corresponding to the operator is selected and bound, so that the automatic connection between the multi-network card server and the target server is established, which avoids the inter-operator connection issue aroused by random allocation of the network cards, as well as the complicated manual allocation, and thus improves the network connection efficiency.

What is claimed is:

1. A method for binding a network card in a multi-network card server, wherein the multi-network card server has a plurality of network cards corresponding to different operators, the method comprises:

acquiring a target address of a target server, wherein a connection between the target server and the multi-network card server is to be established;

querying an IP address library according to the target address to determine an operator to which the target address belongs, wherein the IP address library records a correspondence between IP addresses and operators;

selecting a network card, according to the determined operator to which the target address belongs, corresponding to the determined operator from a plurality of network cards in the multi-network card server; and binding the selected network card to establish the connection between the multi-network card server and the target server, after the step of binding the selected network card to establish the connection between the multi-network card server and the target server, the method further comprises steps of:

judging whether a jump of address occurs when the multi-network card server interacts with the target server; and when judging that the jump of address occurs, taking a received jump address as the target address to return to execute the step of querying an IP address library according to the target address to determine an operator to which the target address belongs, the step of selecting a network card, according to the determined operator to which the target address belongs, corresponding to the determined operator from a plurality of network cards in the multi-network card server, and the step of binding the selected network card to establish the connection between the multi-network card server and the target server.

2. The method of claim 1, wherein the target address is a domain name, the step of querying an IP address library according to the target address to determine an operator to which the target address belongs comprising:

resolving the domain name to obtain an IP address corresponding to the domain name; and querying the IP address library according to the obtained IP address to determine the operator to which the target address belongs.

3. The method of claim 1, wherein the target address is an IP address, the step of querying an IP address library according to the target address to determine an operator to which the target address belongs comprising:

querying the IP address library according to the IP address to determine the operator to which the target address belongs.

4. An electronic device, comprising:

a processor and a memory, the memory being configured for storing executable instructions configured to control the processor to perform the method for binding the network card of claim 1.

5. A non-transitory computer-readable storage medium, having stored thereon computer programs that, upon executed by a processor, cause implementation of the method for binding the network card of claim 1.

6. A method for binding a network card in a multi-network card server, wherein the multi-network card server has a plurality of network cards corresponding to different operators, the method comprises:

acquiring a target address of a target server, wherein a connection between the target server and the multi-network card server is to be established;

querying an IP address library according to an IP address of the target address to determine the IP address of the network card in the multi-network card server corresponding to the IP address of the target address, wherein the IP address library records a correspondence between IP addresses and the IP addresses of the network cards in the multi-network card server;

binding a network card indicated by the determined IP address of the network card to establish the connection between the target server and the multi-network card server, after the step of binding a network card indicated by the determined IP address of the network card to establish the connection between the target server and the multi-network card server, the method further comprises steps of:

judging whether a jump of address occurs when the multi-network card server interacts with the target server; and when judging that the jump of address occurs, taking a received jump address as the target address to return to execute the step of querying an IP address library according to an IP address of the target address to determine the IP address of the network card in the multi-network card server corresponding to the IP address of the target address, and the step of binding a network card indicated by the determined IP address of the network card to establish the connection between the target server and the multi-network card server.

7. The method of claim 6, further comprising, before the step of querying an IP address library according to an IP address of the target address to determine the IP address of the network card in the multi-network card server corresponding to the IP address of the target address, a step of establishing the IP address library, wherein the step of establishing the IP address library comprises:

acquiring a correspondence between the IP address and the IP address of the network card in the multi-network card server, according to the correspondence between the IP address and the operator, and the correspondence between the IP address of the network card in the multi-network card server and the operator; and recording the acquired correspondence between the IP address and the IP address of the network card in the multi-network card server into the IP address library.

8. An electronic device, comprising:

a processor and a memory, the memory being configured for storing executable instructions configured to control the processor to perform the method for binding the network card of claim 6.

9. A non-transitory computer-readable storage medium, having stored thereon computer programs that, upon executed by a processor, cause implementation of the method for binding the network card of claim 6.

10. An apparatus for binding a network card in a multi-network card server, wherein the multi-network card server has a plurality of network cards corresponding to different operators, and wherein the apparatus comprises a processor, coupled to a memory, that executes or facilitates execution of executable modules, the executable modules comprise:

an acquiring module, configured for acquiring a target address of a target server, wherein a connection between the target server and the multi-network card server is to be established;

a querying module, configured for querying an IP address library according to the target address to determine an operator to which the target address belongs, wherein the IP address library records a correspondence between IP addresses and operators;

a selecting module, configured for selecting a network card, according to the operator to which the target address belongs determined by the querying module, corresponding to the determined operator from a plurality of network cards in the multi-network card server;

a binding module, configured for binding the selected network card to establish the connection between the multi-network card server and the target server, and the executable modules further comprise:

a jump address returning module, configured for judging whether a jump of address occurs when the multi-network card server interacts with the target server; and when judging that the jump of address occurs, taking a received jump address as the target address to return to the querying module, so as to repeat the query of the operator to which the jump address belongs, and selecting the network card corresponding to the operator to which the jump address belongs by means of the selecting module, binding the selected network card to establish the connection between the multi-network card server and the target server by means of the binding module.

* * * * *